Feb. 17, 1970  L. R. ZIFFERER  3,495,617

FLOAT VALVE

Filed Nov. 21, 1967  5 Sheets-Sheet 1

INVENTOR.
LOTHAR ROBERT ZIFFERER

BY Samuel J Stree

ATTORNEY

United States Patent Office 3,495,617
Patented Feb. 17, 1970

3,495,617
FLOAT VALVE
Lothar Robert Zifferer, 140 Roosevelt Ave.,
York, Pa. 17405
Filed Nov. 21, 1967, Ser. No. 684,744
Int. Cl. F16k *31/22, 45/00;* G05d *9/02*
U.S. Cl. 137—433    17 Claims

ABSTRACT OF THE DISCLOSURE

A float valve in a chamber containing liquid and an air (or other gas) pocket above the liquid, and controlling the inflow or outflow of the liquid or gas, the rise and fall of the liquid level automatically controlling the operation of the valve; the valve closure means being encased within a cavity formed in the float, removed from direct contact with the body of liquid which supports the float, located at any selected level relative to the surface of said body of liquid, and drawing liquid from or discharging liquid into said body of liquid at selected points relative to said surface.

BACKGROUND OF THE INVENTION

Field of the invention

This invention relates to the broad field of float valves, used in many and diverse industries and applications, including, without limitation, installations designed to discharge waste water from pressurized air systems, steam condensate from steam systems, undesired air from pressurized water system, undesired gases from pressurized liquid systems, and undesired liquids from pressurized gas systems, and to supply gasoline to carburetor systems of internal combustion engines.

Description of the prior art

The closest art known to applicant is Faust Patent No. 2,726,732 issued on Dec. 13, 1955. This patent shows the application of a float valve to pressurized air systems and has for its ultimate objective the draining of accumulated, undesired water from such systems. This would correspond to the form of invention depicted in FIGURES 1–3 of applicant's drawing herein.

However, the Faust valve functions in an entirely different manner from that herein disclosed and claimed. In Faust, the hollow needle serves as a conduit for pressurized air, and not, as in the present invention, for the undesired water which is to be drained from the system. Faust provides a separate compressed air-actuated valve for draining the water.

SUMMARY OF THE INVENTION

The basic invention comprises a float valve consisting of a valve float within a chamber containing a liquid and an air (or other gas) pocket above the liquid, a hollow stem extending into the float, a valve seat at one end of the hollow stem, and a valve needle projecting through the opposite end of the hollow stem for engagement with said valve seat. The valve needle may be hollow or solid. If hollow, the needle and the hollow stem serve as concentric communicating conduits between the inside and outside of said chamber. If the needle is solid, the hollow stem and a tubular member within the float serve as such concentric communicating conduits. In either case, the hollow stem functions also as a guide relative to the needle.

The float valve may be oriented to open or close the valve when the liquid level rises or to open or close the valve when the liquid level drops. It may be connected to serve as a drain valve to drain the liquid when the liquid level rises to a predetermined height. An illustration of this application is in a pressurized air system wherein entrained water is collected in the valve chamber. The accumulated water floats the valve float and controls the valve action to drain the water out of said chamber.

The valve may also be connected to vent the air (or gas) pocket above the liquid when the air (or gas) accumulation reaches a predetermined volume or pressure. Applications of this operation may be found in pressurized water systems, and hot water and steam heating systems, where air locks develop and must be bled or vented.

Conversely, the float valve may be connected to feed liquid into the valve chamber, rather than drain liquid out of it. An illustration of this application may be found in gasoline engine carburetors, where a drop in the gasoline level will cause the valve to open to replenish the gasoline supply.

The float valve which is herein described and claimed is flexible and versatile in its ability to adapt and reorient to different applications and requirements. As is above noted, the valve may be normally open or normally closed, adapted to close (or open) when the liquid level rises, and to open (or close) when the liquid level drops. It may be used for draining or venting purposes, or conversely, for filling or supplying purposes.

Additionally, this float valve may be adapted for selective-level bleeding of a body of liquid. For example, in a pressurized air system, water, oil and foreign solids are entrained in the pressurized air and means are provided for extracting these materials from the air and trapping them in a chamber, forming a sedimentary layer on the chamber floor, while the oil floats to the top of the water to form a surface layer. Above the oil is a pocket of pressurized air. The float valve herein described removes the water from between the oil and sedimentary layers without agitating either, thereby preventing clogging of the valve mechanism.

Another important feature of the invention, above noted, is the interrelationship of the valve needle with a hollow stem for guide purposes. Since the needle projects into the hollow stem from one end, and the valve seat or closure member is situated at the opposite end of the hollow stem, this guiding relationship between stem and needle enables the needle to align itself with the valve seat or closure member, without the precision parts and machining required in other valve mechanisms.

A further important feature of the invention resides in its use of a hollow valve needed having a constricted inlet orifice at the valve seat or closure engaging end. This feature performs two important functions: In the first place, it greatly facilitates operation of the valve despite the exposure of the valve float to substantial air pressure, e.g., 125 pounds p.s.i. The pressure differential on opposite sides of the needle orifice is reduced in direct proportion to the reduction in its cross-sectional area. The smaller the orifice, the smaller the float required to operate the valve. In the second place, the relatively large cross-section of the passage through the hollow needle (in relation to its constricted orifice) greatly increases the discharge capacity of the needle with respect to a given size float.

Still another feature of this invention resides in its use of a hollow valve float which is exposed to equal external and internal pressure. The inner chamber of the float communicates with the air pocket above the float and equalized external and internal pressure is thereby achieved. This obviates the usual problem of providing a float with structurally strong walls (to withstand pressures of the order of 125 p.s.i.) and leak-proof seams. For the purposes of the present invention, a thinwalled plastic molding will suffice as the valve float. Such light-weight construction makes for float efficiency, low cost, and foolproof operation in the sense that it cannot explode or implode in a pressure system, or fill with liquid and cease to function.

Additionally, this float construction provides a self-bailing feature which is of great importance in the automatic operation of the valve, especially in inaccessible or remote installations. A well defined passage provides communication between the inner chamber of the float and the air pocket outside the float. The inner end of the passage dips into any condensate accumulation which might form on the floor of the inner chamber, and any decrease in external pressure (producing a pressure differential relative to the inner chamber) will automatically void the condensate through said passage. The difference in pressure necessary to eject the condensate from the inner chamber is relatively small and certainly well within the normal pressure fluctuations of commercial pressurized air systems.

Still another important feature of the invention resides in its ability to perform manually, in addition to its normal automatic function. The automatic function is performed by the rise and fall of the valve float in response to the rise and fall of the liquid level. The manual function is performed by the use of a finger-actuated control element on the valve needle.

DESCRIPTION OF PREFERRED EMBODIMENTS OF THE INVENTION

Figures 1, 2, 3:
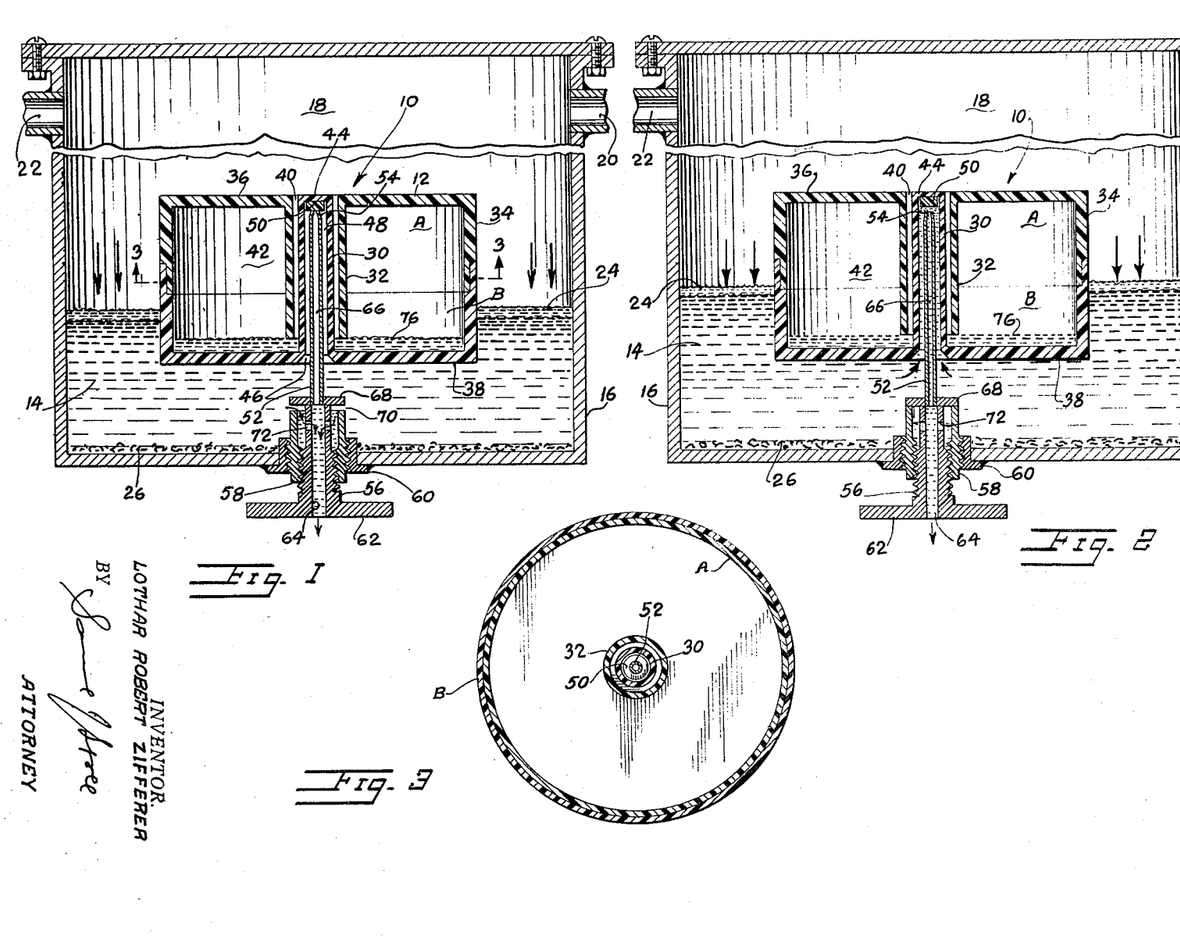
FIGURE 1 is a vertical section through a float valve made in accordance with one form of this invention, said float valve being shown closed, but a manually actuated by-pass valve being shown open.
FIGURE 2 is a similar view, the float valve shown open and the manual by-pass valve shown closed.
FIGURE 3 is a horizontal section on the line 3—3 of FIGURE 1.

Referring to the first form of this invention and to FIGURES 1–3 of the drawing, it will be seen that float valve 10 includes a valve float 12 which is buoyantly supported on a pool of liquid 14 in container 16. Above the liquid level is an air pocket 18 which communicates with a pressurized air system through ports 20 and 22. As pressurized air enters container 16 through one of said ports, it loses its moisture content which accumulates within the container in the form of water pool 14. Oil may also collect within the container and it will float on the water in the form of an oil layer 24. Similarly, foreign matter (solid particles) may accumulate in the container and deposit upon its floor in the form of a layer of sediment 26.

It will be noted that valve float 12 is cylindrical in shape, but this configuration is not critical in the claimed combination. A hollow stem 30 is provided within the float, centrally thereof, and extending vertically when the float is in operative position. Concentrically encircling said hollow stem is a tubular member 32 which is also concentric with the outer wall 34 of the float. The upper end of tubular member 32 is connected to the upper wall 36 of the float and its lower end is spaced from the bottom wall 38 of said float.

Hollow stem 30 and tubular member 32 are spaced from each other to form an annular passage 40 which is open at the top (to communicate with the air pocket 18) and is also open at the bottom (to communicate with the inside chamber 42 of the float). It will thus be seen that the inside of the valve float is in communication with the inside of container 16 to equalize the pressure between them.

Hollow stem 30 is closed at the top by means of a top wall 44 and it is open at the bottom. However, its open bottom end is connected to the bottom wall 38 of container 16 in liquid-tight relation thereto. An opening 46 is formed in said bottom wall in registration with the cavity 48 within the hollow stem and it is through said opening that access may be had to the closed end of the hollow stem.

Secured to wall 44 at the closed end of the hollow stem is a valve sealing or closure element 50. Extending upwardly through the hollow stem for engagement with said sealing element is a hollow valve needle 52. The upper end 54 of said needle is constricted and it is this constricted end which makes contact with the sealing element. The lower end of the valve needle is connected to and supported by a valve control member 56, which itself is in screw-threaded engagement with intermediate fitting 58. This fitting is removably secured to an outer fitting 60 which is affixed to the bottom wall 26 of the container, within an opening formed therein. These details of construction are merely illustrative and should not be construed as limitations upon the invention.

It will be seen that valve control member 56 is a tubular element, open at both ends, and provided with a handle 62 for manual rotation within and relative to fitting 58. Passage 64 formed within said valve control member communicates with passage 66 within the hollow needle and serves as a continuous conduit therewith.

It will also be seen that an annular plate 68 is secured to the top of valve control member 56 for engagement with the top of intermediate fitting 58. When the valve control member is screwed down to its FIGURE 2 position, plate 68 engages fitting 58 and serves as a closure relative thereto. When valve control member 56 is screwed upwardly to its FIGURE 1 position, plate 68 disengages fitting 58 and a passage 70 is formed between them. This passage communicates with openings 72 formed in the valve control member and enables liquid 14 to drain out of container 16 through passage 64. It is by this means that manual draining of container 16 may be effected.

Automatic draining may be provided in the following manner: Valve control member 56 is brought to its down position as illustrated in FIGURE 2. Plate 68 is thereby seated upon fitting 58 to close opening 70 and to prevent an outflow of liquid through holes 72. When the liquid level within the container rises to a predetermined height, as, for example, shown in FIGURE 2, the float will rise sufficiently for the sealing element 50 to clear the constricted end of the hollow needle. Air pressure upon the liquid will force it up through annular passage 48 surrounding needle 52, and then down through passage 66 within said needle and passage 64 within the valve control member 56, thereby draining the container to the liquid level illustrated in FIGURE 1. When this level is attained, the valve float 12 will descend to its FIGURE 1 position and the sealing element will re-engage and close the valve needle, thereby shutting off the flow of liquid out of the container.

It is important to note that the flow of liquid into passage 48 is from a liquid level closely adjacent the bottom of the float. This level is intermediate the layer of oil 24 and the layer of sediment 26, neither of which is seriously agitated by the process. Consequently, only the liquid itself (e.g., water) passes through the valve mechanism, and not the oil or sediment which would clog it. In applications in which there is an intermingling between the oil and the liquid (water) to form an oil-water emulsion above the layer of sediment, it is only this emulsion which is evacuated through the valve mechanism.

Condensate may accumulate, over a period of time, on the floor of float chamber 42 (as indicated by reference numeral 76) and automatic ejection of the accumulation is desirable and, in inaccessible installations, may be imperative. This is achieved by the normal pressure fluctuations in the air pocket outside the float. A decrease in pressure in said air pocket will produce a pressure differential between the air pocket and the float chamber, and the condensate will thereby be ejected through passage 40.

The materials of which the above-described device may be made are not critical. Metal (e.g., stainless steel, brass) or plastics (thermoplastic, thermosetting) or any other suitable material may be used. For purposes of economy, the float may be molded of plastics in the form of two shells A and B as illustrated in FIGURES 1, 2 and 3. These two shells may be joined adhesively or otherwise along their mating edges. An elastomer disc may be used as the valve needle sealing element. The valve needle may be made of stainless steel tubing or the like and the valve control member and fittings may be made of brass, stainless steel or any other suitable material.

The materials which are above mentioned apply equally to all of the other forms of the invention shortly to be described and it will accordingly be unnecessary to repeat them.

Turning now to the second form of this invention as shown in FIGURES 4–8 of the drawing, it will be noted that the valve action is reversed, in the sense that the valve will open when the liquid level and valve float drop, and it will close when the liquid level and valve float rise. Additionally, whereas the first form of valve functions to discharge liquid, the second form functions to vent air.

Figures 4, 5, 6, 7, 8:
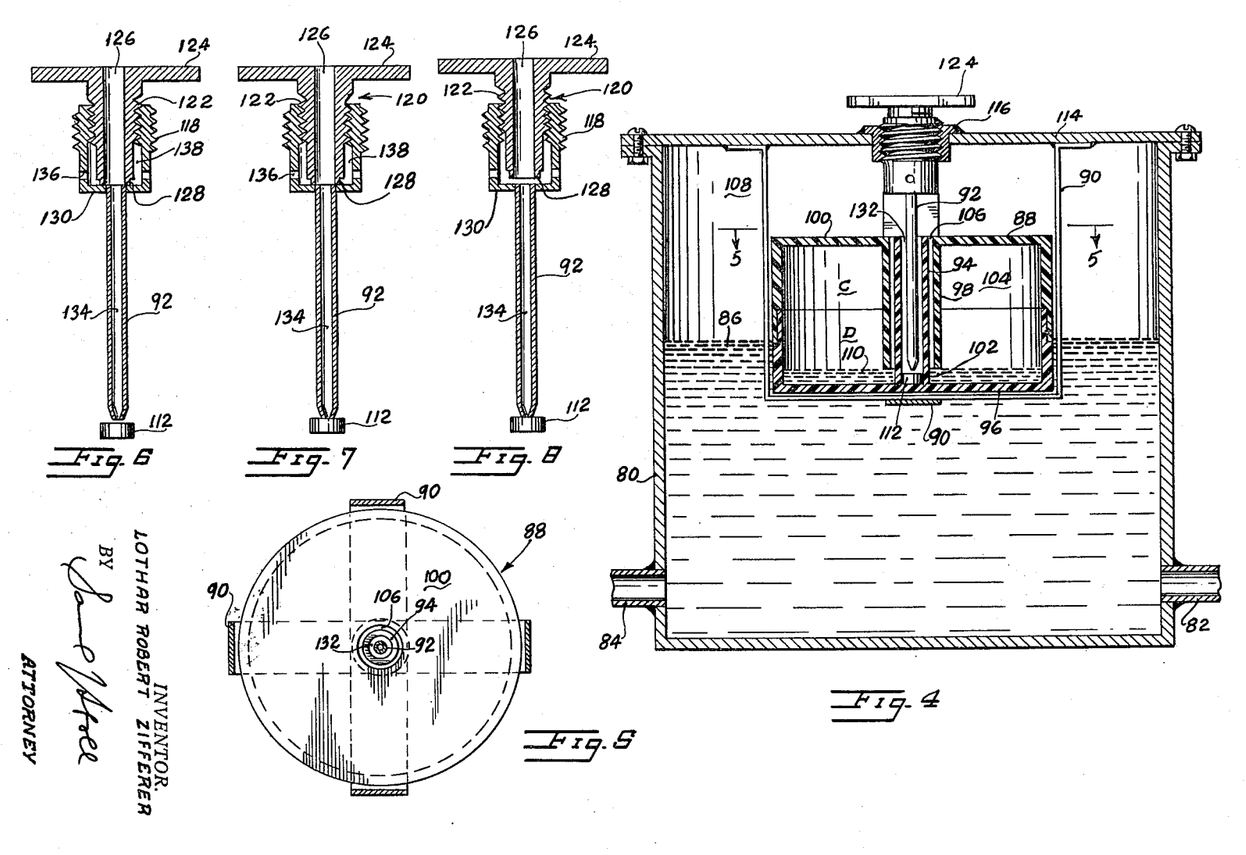
FIGURE 4 is a vertical section through a float valve made in accordance with a second form of this invention.
FIGURE 5 is a horizontal section therethrough on the line 5—5 of FIGURE 4.
FIGURE 6 is an enlarged vertical section through the valve needle of FIGURE 4, showing it disengaged from the valve closure member to open the valve.
FIGURE 7 is a similar view showing the valve needle in engagement with the closure member to close the valve.
FIGURE 8 is a view similar to that of FIGURE 7, but showing a manually actuated by-pass valve open.

The second form of this invention is particularly applicable to hot water systems requiring air bleeding means. Container 80 is connected by means of ports 82 and 84 to a hot water system and it contains a fluctuating body of water 86 which supports valve float 88. An open bracket 90 confines the movement of the float within predetermined limits and prevents the float from totally disengaging the valve needle 92 when the water level drops below its normal low.

Float 88 may be made of two plastic-molded shell sections C and D joined adhesively or otherwise along their mating edges. As in the first form of the invention, the float is preferably, but not necessarily, cylindrical in shape, with a hollow stem 94 extending axially (vertically) thereof. In the second form of the invention, the hollow stem is closed at the bottom, being secured to the bottom wall 96 of the float, and it is open at the top.

Encircling the hollow stem in concentric, spaced relation thereto, is a tubular element 98 which is secured to the top wall 100 of the float. The lower end of tubular element 98 does not reach the bottom wall of the float and an opening 102 is thereby formed to provide communication between the inside chamber 104 of the float and annular passage 106 between the hollow stem 94 and the tubular element 98. Chamber 104 is accordingly in communication with the air pocket 108 above the surface of the liquid in container 80. As in the first form of the invention, this prevents a pressure differential from building up between the inside and outside of the float chamber, and permits of relatively inexpensive, structurally weak, float. Additionally, it provides automatic ejection of condensate accumulations 110 from the floor of the float chamber through annular passage 106. As in the first form of the invention, reduced pressure outside the float chamber, producing relatively higher pressure within the float chamber will evacuate the condensate.

At the closed lower end of the hollow stem is a valve sealing element 112. It will be noted that the valve needle 92 projects downwardly through the open upper end of the hollow stem toward the valve sealing element. When the liquid level and float rise to a predetermined height, the sealing element makes contact with the needle to close the valve; conversely, when the liquid level and float drop below such predetermined height, the sealing element makes contact with the needle to close the valve; conversely, when the liquid level and float drop below such predetermined height, the sealing element disengages the needle to open the valve.

The top wall 114 of the container 80 has an opening formed therein to receive a fitting 116 and threaded into said fitting is a cup-shaped, internally and externally screw-threaded needle-supporting member 118. Threaded into said needle-supporting member 118 is a valve control member 120. This control member comprises a tubular body 122 and a handle 124 connected to the top of the tubular body. An air passage 126 is formed in said control member 120, being open at both ends, and serving as the air venting means of the valve mechanism.

It will be seen in FIGURE 6, 7 and 8 that the lower end of the control member 120 is provided with an annular valve sealing means 128 which is adapted to seat against the floor 130 of the needle-supporting element 118. In such case, the manually operated valve is closed and the float-controlled valve becomes operative. When the water level falls below a predetermined point, the float will drop and the valve needle 92 will be disengaged by the valve sealing element 112. This will open the valve needle to the air pocket 108 and permit the escape of air through annular passage 132 (between the inner wall of the hollow stem and the valve needle), the passage 134 through the hollow needle, and passage 126 through the valve control member 120.

Conversely, when the liquid level and float rise to said predetermined height, the valve sealing element 112 will engage the valve needle and close the passage therethrough. This will, of course, close the needle valve. When the needle valve is thus closed, it may be desired to operate the manual valve. In such case, the valve control handle 124 is actuated and the valve control member 120 is rotated to screw it out of engagement with the floor 130 of needle support element 118. The manually controlled valve is now open and air is permitted to pass from the air pocket 108 in the container, through lateral openings 136 in the cylindrical wall of said needle-support element 118, thence into valve chamber 138 in said support element, and finally out through passage 126 in said valve control member 120.

FIGURE 6 illustrates the situation of the float-controlled needle valve in open position and the manually controlled valve in closed position. In FIGURE 7 the float-controlled needle valve is closed and so is the manually controlled valve. In FIGURE 8 the float-controlled needle valve remains closed while the manual valve is open.

Figure 9:
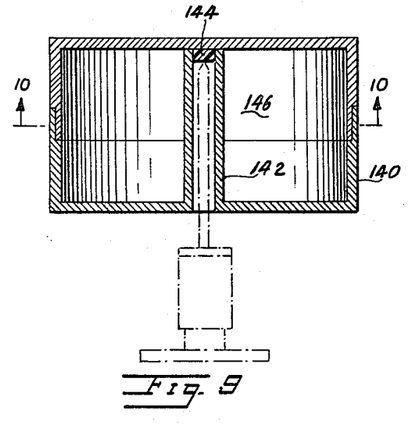
FIGURE 9 is a vertical section through a modified form of valve float.
Figure 10:
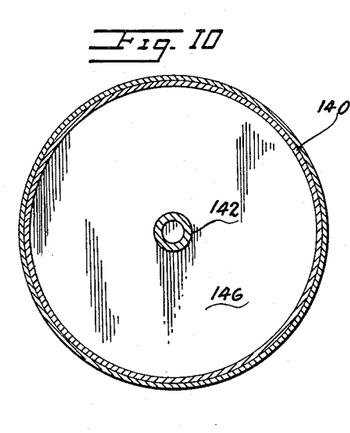
FIGURE 10 is a horizontal section therethrough on the line 10—10 of FIGURE 9.

FIGURE 9 shows another form of float construction. Float 140 is a closed, hollow, cylindrical float having a hollow stem 142 extending axially thereof. This hollow stem is closed at the top and open at the bottom and is provided with a valve sealing element 144 at its closed top end. No communication is provided between the chamber 146 within the float and the outside of the float, and consequently a pressure differential may develop between the inside and outside of said float. This float requires a structurally strong wall construction when subjected to the high pressures of pressurized air systems and the like. When oriented in the manner shown in FIGURE 9, float 140 may be used in the application illustrated in FIGURES 1 and 2. When inverted, it may be used in the application illustrated in FIGURE 4.

Figure 11:
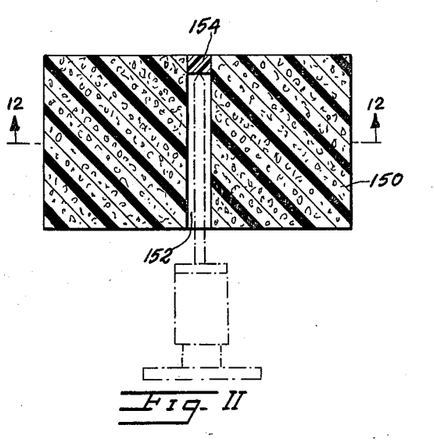
FIGURE 11 is a vertical section through another form of valve float.
Figure 12:
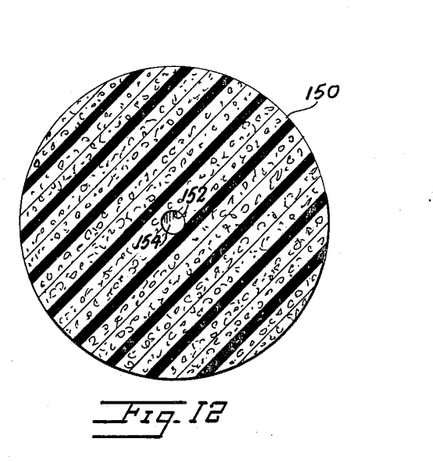
FIGURE 12 is a horizontal section therethrough on the line 12—12 of FIGURE 11.

FIGURE 11 shows a float 150 which is solid in the sense that it has no inner chamber corresponding to chamber 146 in FIGURE 9. Instead, it is made of expanded foam plastics (e.g., polyurethane) which fills it entirely except for an axial cavity 152 is a valve needle sealing element 154. Float 150 may be used in its FIGURE 11 position or inverted therefrom Referring now to FIGURES 13 and 14, it will be seen that the valve needle may be formed with various constriction configurations at its inlet end. Illustrative is hollow needle 160 in FIGURE 13 which is shown to have a generally conical (truncated cone) tip 162. Hollow needle 164 in FIGURE 14 is shown to have a generally cylindrical tip 166 with a tapered shoulder 168 which joins the tip to the main stem of the needle. These hollow needles are intended for use mainly in applications where there is a substantial pressure differential between the inner and outer wall surfaces of the needle.

Figure 15:
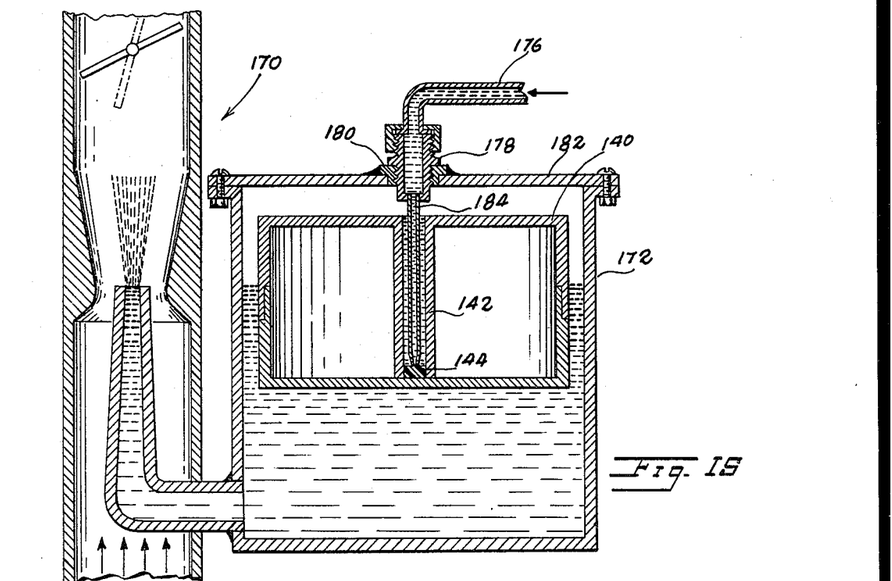
FIGURE 15 is a vertical section showing a third form of float valve made in accordance with this invention, showing its application to a carburetor for gasoline engines, the valve being shown closed.
Figure 16:
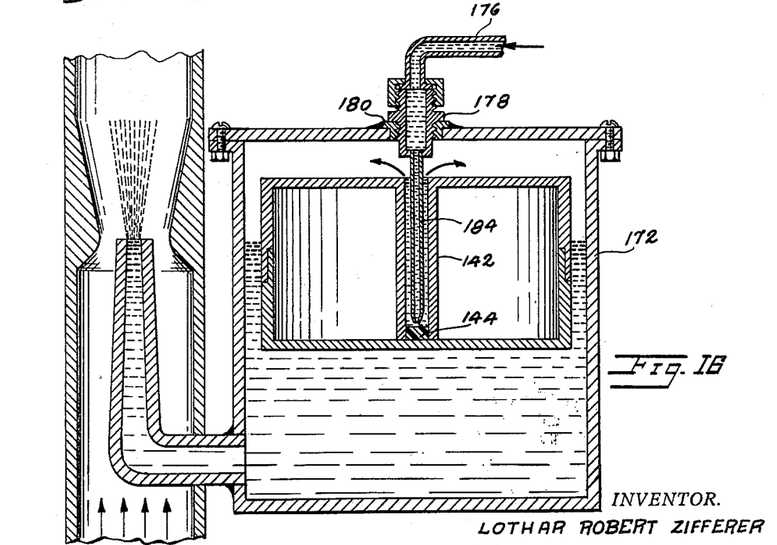
FIGURE 16 is a similar view showing the valve open.

FIGURES 15 and 16 illustrate the application of the present invention to a carburetor 170. A float, such as float 140 shown in FIGURE 9, is placed in carburetor bowl 172, floating on gasoline 174 therein. Gasoline enters the bowl through a line 176 which is removably attached to a screw fitting 178 mounted in a permanently fixed fitting 180 in the cover plate 182 of the carburetor bowl. These and similar structural details are purely illustrative and are not intended to reflect the actual designs and specifications of commercial carburetors.

Figure 13:
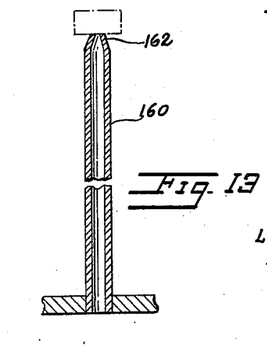
FIGURE 13 is a fragmentary vertical section through a valve needle, showing one form of constricted inlet orifice.
Figure 14:
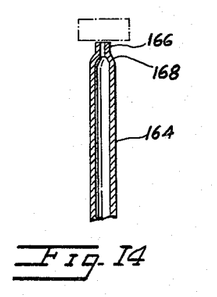
FIGURE 14 is a similar view showing another form of constricted inlet orifice.

Secured to the lower end of fitting 178 is a hollow valve needle 184 of the type shown in FIGURE 13. When the gasoline supply in the carburetor bowl drops to the level of FIGURE 16, the float will descend to its FIGURE 16 position and valve sealing element 144 will disengage and thereby open the valve needle 184. Gasoline will flow into the carburetor bowl through gas line 176 and fitting 178, until the gasoline level of FIGURE 15 is reached. At this point, the float will rise sufficiently to cause its valve sealing element 144 to re-engage and close the valve needle and thereby shut off the flow of gasoline into the bowl.

Figure 17:
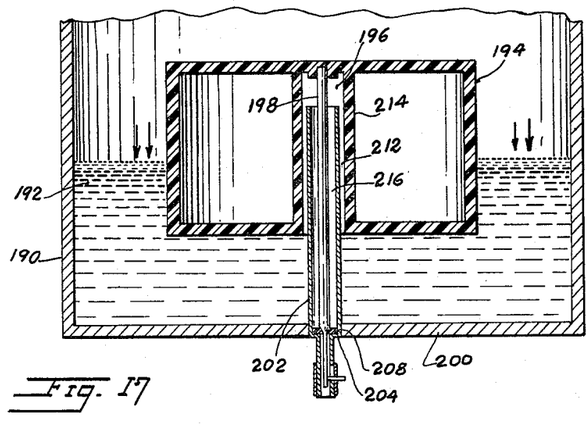
FIGURE 17 is a fragmentary vertical section through a fourth form of this invention, the valve being shown closed.

FIGURES 17–20 show how a solid valve needle may be used in the present invention. In FIGURE 17 container 190 contains liquid 192 under pressure. Float 194 has the familiar configuration of float 140 shown in FIGURE 9. However, instead of having a valve sealing member at the upper, closed end of cavity 196 (corresponding to sealing element 144 in float 140), it has a solid valve needle 198 which projects downwardly through said cavity. It will also be seen that secured to bottom wall 200 of the container, and projecting upwardly therefrom, is a hollow stem 202. This hollow stem is concentric with the valve needle which extends coaxially therethrough.

Hollow stem 202 is open at both ends, but at its lower end it is stepped to provide an annular inner shoulder 204 and a reduced neck portion 206 depending therefrom. Supported on shoulder 204 is an annular valve seat 208 which is engageable by tapered portion 210 of the valve needle. Below said tapered portion is an extension of reduced diameter.

Figure 18:
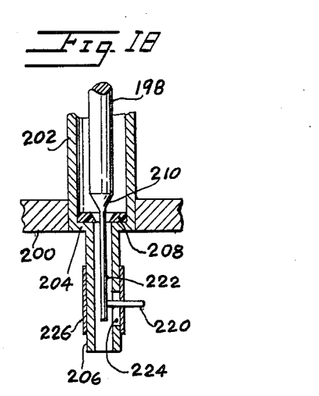
FIGURE 18 is an enlarged fragmentary vertical section through the valve mechanism of FIGURE 17, showing the valve in manually held open position.

When the liquid level rises above a predetermined point, the valve float will similarly rise to cause its valve needle 198 to disengage the valve seat 208. This is shown in FIGURE 18. When this condition occurs, the liquid will be forced up annular passage 212 formed between the hollow stem and the tubular member 214 of the float, then down the annular passage 216 formed between the hollow stem and the valve needle, thence through the open valve seat 208, and finally out through reduced hollow stem extension 206. When the liquid level drops to the level shown in FIGURE 17, the valve needle will re-engage the valve seat and close it in the manner shown in said figure. This will shut off the flow of liquid out of the container.

Should it be desired to operate the needle valve manually, a laterally extending pin 220 is provided on the reduced extension 222 of the needle. This pin projects out of the reduced end portion 206 of the hollow stem through a vertically extending slot 224 and a slideable sleeve 226 seals said slot against leakage. The pin may be raised manually to elevate the valve needle to its open position relative to the valve seat and this will drain the liquid contents of the container.

Figure 19:
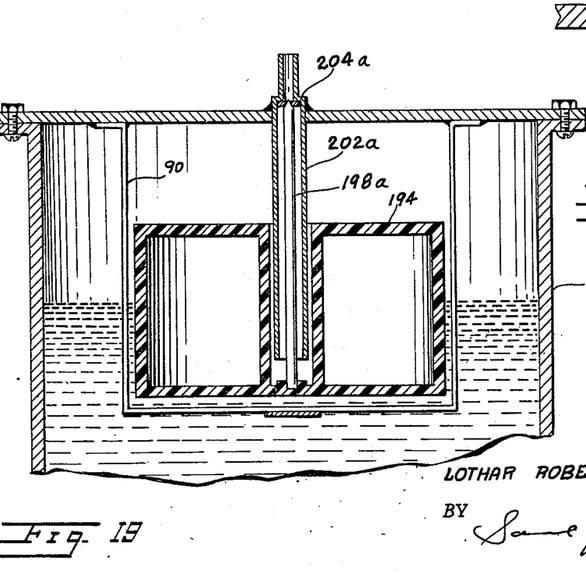
FIGURE 19 is a fragmentary vertical section through a fifth form of this invention, the valve being shown closed.
Figure 20:
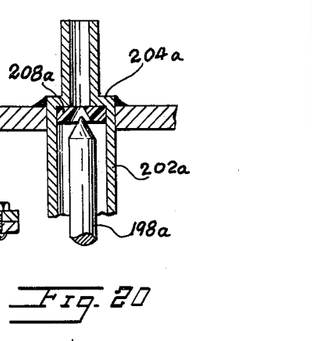
FIGURE 20 is an enlarged fragmentary vertical section through the valve mechanism of FIGURE 19, showing it in open position.

Referring now to FIGURES 19 and 20, it will be observed that valve float 194 has been inverted (from its FIGURE 17 position) and that its valve needle 198 now projects upwardly. Similarly, the position of hollow stem 202 is inverted (from its FIGURE 17 position) and it is now secured to the top wall of container 190 instead of its bottom wall.

When the air volume is reduced in container 190 to its FIGURE 20 proportions and the liquid level accordingly rises to the height shown in that figure, float 194 will also rise and carry its valve needle into valve seat engaging and closing position. When the air volume increases within the container and the liquid level drops, the float will also drop, and the valve needle will disengage the valve seat. This will open the valve, permitting the escape of air.

The foregoing is illustrative of various applications thereof to different fluid systems, and it will be understood that modifications may be incorporated in these embodiments and uses of the invention within the broad scope of the appended claims.

What is claimed is:
1. A float valve, comprising:
a float;
a hollow stem in said float;
one end of the hollow stem being open;
valve closure means at the opposite end of said hollow stem;
an open-ended hollow needle projecting into the hollow stem through the open end of said hollow stem;
said float being movable in one direction relative to said needle to bring the valve closure means into sealing engagement with said needle; and
being movable in the opposite direction to remove the valve closure means from sealing engagement with said needle;
the float being mounted in a pressure chamber,
both the float and the liquid which supports it being exposed to gas under pressure, such as compressed air;
said float being hollow; and having an opening formed therein above the level of the liquid, in order to provide communication between the inside of the float and the inside of the pressure chamber, and thereby to equalize the pressure between them.

2. A float valve in accordance with claim 1, wherein:

the float is movable by gravity in the first mentioned direction relative to the hollow needle to bring the valve closure means into sealing engagement with said needle; and said float being buoyantly movable in the opposite direction to remove the valve closure means from sealing engagement with said needle.

3. A float valve in accordance with claim 1, wherein:

the float is buoyantly movable in the first mentioned direction relative to the hollow needle to bring the valve closure means into sealing engagement with said needle; and said float is movable by gravity in the opposite direction to remove the valve closure means from sealing engagement with said needle.

4. The combination of claim 1, wherein:

a sleeve is provided in the float encircling the hollow stem in generally concentric relation thereto, an annular space being provided between the sleeve and the hollow stem, the lower end of said annular space being in communication with the inside of the float, the upper end of said annular space defining the float opening above the level of the liquid, whereby communication and pressure equalization between the inside of the float and the inside of the pressure chamber are provided through said annular space.

5. The combination of claim 1, wherein:

the float is movable in the first mentioned direction to bring the valve closure means into sealing engagement with one open end of said open-ended hollow needle;

said open end of the hollow needle being reduced in cross-sectional dimensions in relation to the main body of the needle to increase the effectiveness of the sealing action between said valve closure means and said needle.

6. The combination of claim 1, wherein:

sealing engagement of the hollow needle occurs when the valve closure means is in engagement with one open end of said needle;

said float being mounted in a high pressure chamber as indicated to provide a substantial pressure differential between the inside or the chamber and the inside of the needle when the valve closure means is in sealing engagement with said open end of the needle;

said valve closure means being held in sealing engagement with said open end of the needle under the weight of the float and the pressure exerted thereon;

said open end of the needle being of reduced cross-section to reduce the effective pressure differential area between the valve closure means and the needle; and thereby to reduce the force of buoyancy required to raise the float and to disengage the valve closure means from the needle.

7. The combination of claim 1, wherein:

sealing engagement of the hollowing needle occurs when the valve closure means is in engagement with one open end of said needle;

said open end of the needle being its inlet end;

the opposite end of the needle being its discharge end;

said inlet end of the needle being of reduced cross-section in relation to the main body of the needle to increase its discharge capacity.

8. A float valve in accordance with claim 1, wherein: the valve closure means is integral with the opposite end of the hollow stem of the float;

said float, hollow stem and valve closure means being molded of plastics.

9. A float valve comprising:

a float;

a hollow stem extending into said float;

one end of the hollow stem being open;

a valve seat at the opposite end of said hollow stem, a valve needle projecting into the hollow stem through its open end;

said float being movable in one direction to bring the needle and valve seat into sealing engagement with each other;

being movable in the opposite direction to disengage the needle and valve seat from each other;

the float being provided with a tubular element extending vertically therein;

one end of said tubular element being closed, the opposite end being open;

the valve needle being secured to the closed end of said tubular element and projecting outwardly therefrom through its open end;

the hollow stem projecting into said tubular element through its open end and in concentric relation thereto and to the valve needle;

whereby concentric annular passages are formed between the tubular element and the hollow stem and the valve needle;

said concentric annular passages being in communication with each other at said closed end of the tubular element and said open end of the hollow stem;

the float being disposed within a liquid container;

the hollow stem being fixed at one end to a wall of said liquid container and extending vertically therefrom and into the tubular element in the float; and an opening formed in said container wall in registration with said hollow stem;

whereby communication between the inside and outside of said liquid container is provided through said wall opening, hollow steam and tubular element.

10. A float valve in accordance with claim 9, wherein.

the valve seat is provided at the fixed end of the hollow stem;

said valve seat having an opening formed therein in registration with the container wall opening;

whereby communication between the inside and outside of the container is established when the valve needle is out of engagement with said valve seat; and communication between the inside and outside of the container is interrupted when the valve needle is seated in said valve seat.

11. A float valve in accordance with claim 10, wherein:

the closed end of the tubular element is its upper end;

the valve needle projecting downwardly therefrom in the direction of the bottom wall of the liquid container;

said hollow stem being fixed at its lower end to said bottom wall and projecting upwardly into said tubular element;

the valve seat being provided at said lower end of the hollow stem;

whereby the valve needle engages the valve seat when the liquid level drops and the float descends, and the valve needle disengages the valve seat when the liquid level rises and the float rises with it.

12. A float valve in accordance with claim 11, wherein:

a drain spout is secured to the bottom wall of the container in registration with the opening formed in said wall; and a manual operating element is secured to the lower end of the valve needle;

whereby the valve needle may be manually operated from outside the container to drain its liquid contents.

13. A float valve in accordance with claim 10, wherein:
the closed end of the tubular element is its lower end;
the valve needle projecting upwardly therefrom in the direction of the top wall of the liquid container;
said hollow stem being fixed at its upper end to said top wall and projecting downwardly into said tubular element;
the valve seat being provided at said upper end of the hollow stem;
whereby the valve needle disengages the valve seat when the liquid level drops and the float descends, and the valve needle engages the valve seat when the liquid level rises and the float rises with it.

14. A float valve for use in a pressurized chamber wherein pressure fluctuations are encountered, said float valve comprising:
a valve mechanism; and
a float within such pressurized chamber, controlling said valve mechanism;
said float being hollow and having a passage formed therein to provide communication between the inside of the float and the pressurized chamber to equalize the pressure between them;
whereby a relatively higher pressure within the hollow float, resulting from a lowering of the pressure outside the hollow float, will eject through said passage such accumulation of condensate as may have collected inside the hollow float.

15. A float valve in accordance with claim 14, wherein:
the hollow float is provided with top, bottom and side walls;
the top wall having an opening formed therein;
a tubular element being connected at its upper end to said top wall in registration with said opening;
the lower end of said tubular element approaching, but being spaced from, said bottom wall; and
a second tubular element mounted within the first tubular element in spaced, concentric relation thereto;
said second tubular element being connected at its lower end to the bottom wall of said float;
its upper end projecting upwardly toward the opening in the top wall of the float;
the annular space between the two tubular elements constituting the passage between the inside and outside of the hollow float through which the pressure is equalized and the condensate is ejected.

16. A float valve comprising:
a float;
a hollow stem in said float;
one end of the hollow stem being open;
valve closure means at the opposite end of said hollow stem;
an open-ended hollow needle projecting into the hollow stem through the open end of said hollow stem;
said float being movable in one direction relative to said needle to bring the valve closure means into sealing engagement with said needle; and
being movable in the opposite direction to remove the valve closure means from sealing engagement with said needle;
the float being mounted in a container for liquid;
the hollow stem of said float extending vertically therein, its open end facing one of the walls of said container;
one end of the hollow needle being fixed to said container wall;
the opposite end of the needle projecting vertically into said hollow stem through the open end thereof and toward the valve closure means at the opposite end of said hollow stem;
an opening in said container wall through which the hollow needle provides communication between the inside and outside of the container;
a drain valve being provided between said hollow needle and said container wall at the opening in said wall;
said drain valve being normally open to said hollow needle to permit an outflow of liquid from said container, through said needle, when the valve closure means is disengaged from the needle;
said drain valve having a passage which by-passes the hollow needle and provides direct communication between the inside and outside of the container; and
manually operable valve means in said by-pass passage for manual draining of said container.

17. A float valve in accordance with claim 16, wherein:
the hollow needle is connected through the container wall opening to a source of liquid under pressure for supplying liquid to said container.

References Cited

UNITED STATES PATENTS

| | | | |
|---|---|---|---|
| 900,329 | 10/1908 | Vance | 137—191 |
| 959,927 | 5/1910 | Flinn | 137—191 |
| 2,492,806 | 12/1949 | Levine | 119—80 |
| 2,680,715 | 6/1954 | Cook | 73—322.5 |
| 2,726,732 | 12/1955 | Faust et al. | 137—413 X |
| 3,211,170 | 10/1965 | White | 137—432 |
| 3,230,970 | 1/1966 | Smith | 137—436 |
| 3,275,020 | 9/1966 | Fujiwara | 137—195 |

WILLIAM F. O'DEA, Primary Examiner

D. R. MATTHEWS, Assistant Examiner

U.S. Cl. X.R.

73—322.5